US012395014B2

(12) United States Patent
Fan et al.

(10) Patent No.: US 12,395,014 B2
(45) Date of Patent: Aug. 19, 2025

(54) IN-BODY WIRELESS CHARGING SYSTEM

(71) Applicant: Rutgers, The State University of New Jersey, New Brunswick, NJ (US)

(72) Inventors: Xiaoran Fan, New Brunswick, NJ (US); Richard Howard, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 693 days.

(21) Appl. No.: 17/778,645

(22) PCT Filed: Nov. 12, 2020

(86) PCT No.: PCT/US2020/060194
§ 371 (c)(1),
(2) Date: May 20, 2022

(87) PCT Pub. No.: WO2021/101783
PCT Pub. Date: May 27, 2021

(65) Prior Publication Data
US 2023/0028864 A1  Jan. 26, 2023

Related U.S. Application Data

(60) Provisional application No. 62/938,051, filed on Nov. 20, 2019.

(51) Int. Cl.
*H02J 50/23* (2016.01)
*H02J 50/40* (2016.01)
*H04B 7/06* (2006.01)

(52) U.S. Cl.
CPC ............. *H02J 50/23* (2016.02); *H02J 50/40* (2016.02); *H04B 7/0617* (2013.01); *H02J 2310/23* (2020.01)

(58) Field of Classification Search
CPC ........ H02J 50/23; H02J 50/40; H02J 2310/23; H02J 7/00034; H02J 50/80; H02J 50/90; H02J 50/20; H04B 7/0617; H04B 5/79
See application file for complete search history.

(56) References Cited

U.S. PATENT DOCUMENTS 8,102,796 B2 *   1/2012   Kekalainen ....... H04W 52/0216
                                                    370/336
10,291,055 B1    5/2019   Bell et al.
(Continued)

FOREIGN PATENT DOCUMENTS

WO    2018208130 A1    11/2018

OTHER PUBLICATIONS

International Search Report and Written Opinion for corresponding PCT Application No. PCT/US2020/060194, dated Feb. 3, 2021.

*Primary Examiner* — Jack Chiang
*Assistant Examiner* — Brandon Bowers
(74) *Attorney, Agent, or Firm* — MEAGHER EMANUEL LAKS GOLDBERG & LIAO, LLP

(57) ABSTRACT

Various embodiments comprise systems, methods, architectures, mechanisms or apparatus providing far-field wireless charging of implanted medical devices, Internet of Things (IoT) and the like via a leader radio configured for receiving spread spectrum (SS) modulated radio waves from a plurality of slave radios within an area including the leader radio and a target device, for receiving from the target device backscatter radio energy associated with the (SS) modulated radio waves, and for generating slave radio control signals; the leader radio, in a charging mode of operation, being configured for determining changes in received power associated with backscatter radio energy received from the target device and responsively transmitting control signals toward the slave radios configured to cause the slave radios to modify respective radio wave transmission times such that (Continued)

slave radio wave transmissions are substantially phase aligned when received at the target device.

24 Claims, 5 Drawing Sheets

(56) References Cited

U.S. PATENT DOCUMENTS

| | | |
|---|---|---|
| 2014/0375261 A1 | 12/2014 | Manova-Elssibony et al. |
| 2015/0102681 A1 | 4/2015 | Leabman et al. |
| 2016/0126753 A1* | 5/2016 | Wight .................... H02J 50/90 |
| | | 307/104 |
| 2017/0276779 A1 | 9/2017 | Seller |
| 2017/0324448 A1 | 11/2017 | Moshfeghi |
| 2025/0071676 A1* | 2/2025 | He .................... H04W 52/0209 |

* cited by examiner

IN-BODY WIRELESS CHARGING SYSTEM

CROSS-REFERENCE TO RELATED APPLICATION

This application is a National Stage Entry of Patent Cooperation Treaty Application No. PCT/US2020/060194, filed Nov. 12, 2020, which claims priority to U.S. Provisional Patent Application No. 62/938,051 filed on Nov. 20, 2019 entitled IN-BODY WIRELESS CHARGING SYSTEM, which application is incorporated herein by reference in its entirety

FIELD OF THE DISCLOSURE

The present disclosure generally relates to wireless power transfer and, in particular, to far-field wireless charging suitable for use in a variety of applications including the wireless charging of batteries of devices such as implanted medical devices.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Each year millions of patients improve their quality of life through medical implants. These devices are inserted into a human body to replace a missing body part, modify a body function, or provide support to organs and tissues. While functional innovations on medical implants are going full steam ahead, the amount of energy required by these devices remains substantial. Though cutting-edge batteries could enable medical implants (e.g., pacemaker) to function for years, the use of a battery is not always feasible. For example, there may not be enough space in the brain or body to accommodate a battery having a size proportional to its lifetime. Other limited solutions exist, such as placing the battery of a brain stimulator in the user's chest or even outside the body, with wires running between the battery and the stimulator. Battery replacement, on the other hand, is risky as it usually requires a surgery that may introduce extra complications.

Wireless charging has received attention in recent years as a viable alternative. Wireless charging can be simply performed on an office table or in a car. As far as medical implants are concerned, they are primarily charged through electromagnetic coupling in the near field, which are inherently intrusive and require an implanted coil. Moreover, the charging efficiency of these methods drops significantly with the reduction of coil size and the increase of coil separation, which severely hinders the miniaturization of medical implants. Furthermore, the near-field methods usually require the user to wear bulky transmitter coils, which need to be carefully placed considering the location of the implant coil. Finally, even if the patients can sit still for hours during the charging process, the implant coil may move as blood flows and break the coupling.

Therefore, far-field safe wireless power transfer technologies are desirable for numerous reasons and long-sought by industry. Unfortunately, various attempts have thus far been disappointing in terms of safety and/or efficacy.

SUMMARY

Various deficiencies in the prior art are addressed by systems, methods, architectures, mechanisms or apparatus providing far-field wireless charging of implanted medical devices or other devices, Internet of Things (IoT) and the like via a leader radio configured for receiving spread spectrum (SS) modulated radio waves from a plurality of slave radios within an area including the leader radio and a target device, for receiving from the target device backscatter radio energy associated with the (SS) modulated radio waves, and for generating slave radio control signals; the leader radio, in a charging mode of operation, being configured for determining changes in received power associated with backscatter radio energy received from the target device and responsively transmitting control signals toward the slave radios configured to cause the slave radios to modify respective radio wave transmission times such that slave radio wave transmissions are substantially phase aligned when received at the target device.

A far-field wireless charging system according to one embodiment comprises: a plurality of slave radios located about an area, each slave radio configured for transmitting a respective spread spectrum (SS) modulated radio wave within the area, and for adapting a time-offset of the radio wave in response to a control signal; and a leader radio, configured for receiving backscatter radio energy from a target device within the area, for receiving SS modulated radio waves from slave radios, and for generating slave radio control signals. The leader radio, in a time synchronization mode of operation, is configured for determining changes in received power associated with radio wave transmissions of at least a portion of the plurality of slave radios and responsively interacting with the slave radios to modify respective radio wave transmission times such that slave radio wave transmissions are received at the leader radio in a substantially synchronized manner to thereby achieve beamforming at the leader radio. The leader radio, in a charging mode of operation, is configured for determining changes in received power associated with backscatter radio energy received from a target device and responsively interacting with the slave radios to modify respective radio wave transmission times such that slave radio wave transmissions are received at the target device in a substantially synchronized manner to thereby achieve beamforming at the target device.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
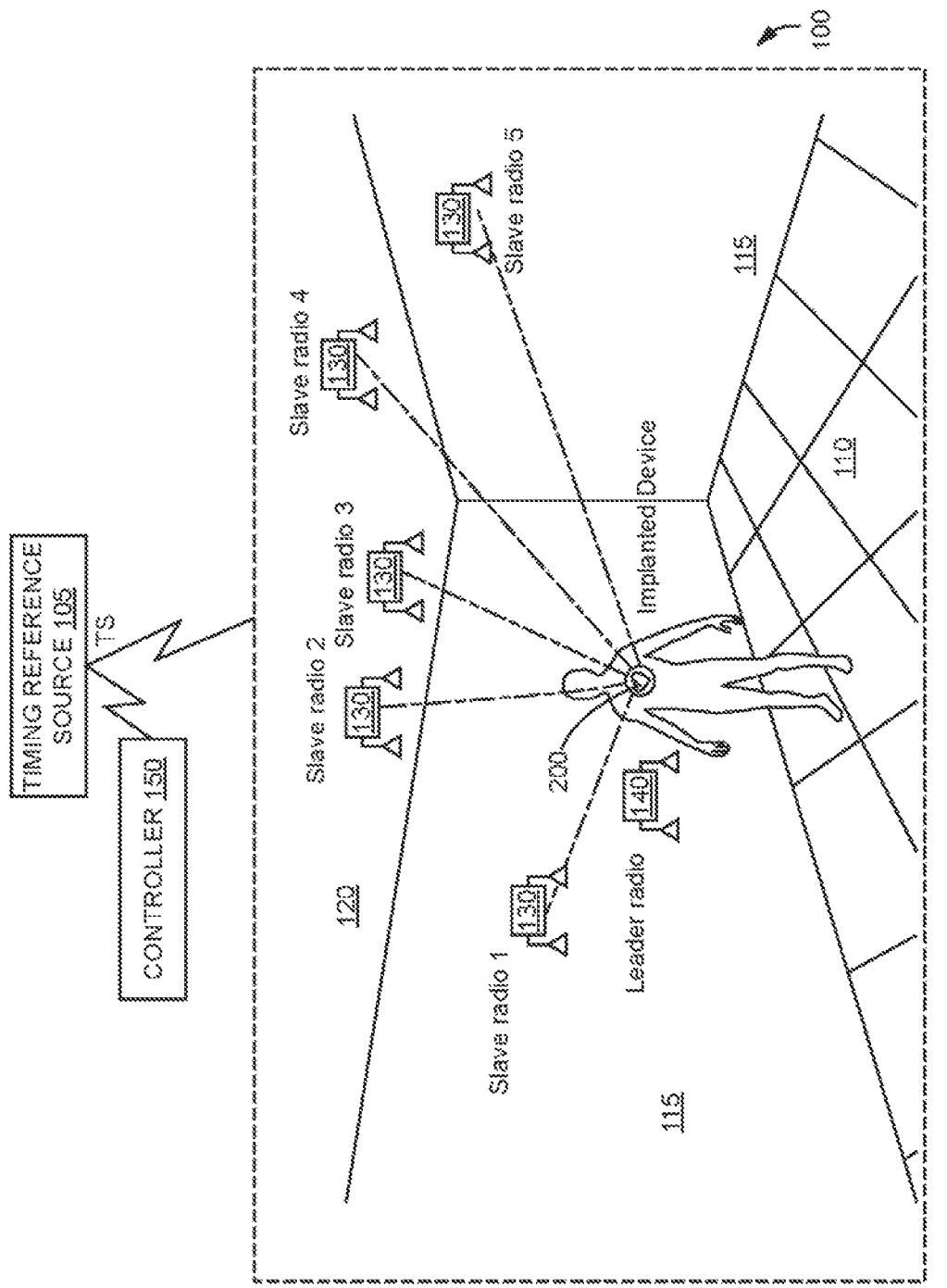
FIG. 1 depicts a wireless charging system according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a wireless power transfer (WPT) system in a manner avoiding the problems associated with traditional beamforming systems (i.e., overheating issues along the beam path) or magnetic resonant systems (i.e., high energy everywhere in within the field). The disclosed WPT system utilizes multiple transmitters disposed about (i.e., surrounding) a target device (target receiver) for transmitting respective beams toward the target device, wherein a collaborative alignment or coherent combining of the beam phases at the target device provides precisely focused energy just at the target device, thereby enabling omnidirectional wireless power transfer to the target device.

Specifically, a high energy density location or region is formed at a focal point location (i.e., the location of the target device) while low energy density exists at other locations. Using a number of transmitters, the WPT can achieve a peak to average energy density ratio of 100:1 or more. The WPT may be implemented using electromagnetic waves (e.g., radio frequency, optical frequency etc.) as well as mechanical waves (e.g., ultrasonic waves).

In one embodiment, a wireless power transfer system is deployed within a conference room, building or other volume of three-dimensional space to generate therein a high energy density spot or region using waves transmitted from a number of locations surrounding the three dimensional space or at least surrounding the target device. A target device located at the high energy density location or region may thereby receive sufficient power to perform a charging function and/or (as will be discussed more detail below) received communications in an extremely secure manner.

Generally speaking, a number of wave transmitting antennas are located such that some or all of the antennas define therebetween a three dimensional space within which the various embodiments discussed herein are operable to provide energy to a target device via respective paths. In various embodiments, the wave transmitting antennas may be located in a room such as at multiple locations on a ceiling or floor or wall, around a desk or bed, or anywhere suitable for transmitting energy waves towards a target device. Further, the waves propagated from the transmitting antennas follow different paths to the target device and such paths may include direct paths, indirect paths (e.g., reflected from surrounding structures) and so on.

One embodiment comprises a far-field wireless power transferring (WPT) system configured to continually charge and store energy in a device (e.g., a medical device or other device implanted in a human body or animal body) with consistent high power, even if the implant moves or shifts around inside the body within which the device is implanted. This WPT system differs from traditional beamforming or magnetic resonant systems. The WPT system exploits a distributed antenna array structure combined with a backscatter-assisted beamforming algorithm in order to concentrate the RF energy immediately surrounding the implanted device. This allows for a very low radiation exposure level on all other areas of the body. A prototype design of the WPT system utilizing 21 software-defined radios and a controller circuit achieved a 0.37 mW average charging power inside a 10 cm-thick pork belly, which is enough energy to wirelessly power a wide range of commercially available medical devices from outside a human body.

The distributed antenna array is controlled using a backscatter-assisted beamforming algorithm configured to cause the concentration of RF energy within a small volume surrounding a medical implant while keeping radiation exposure levels on other body parts very low, thereby reducing the risk of overheating. The algorithm uses an enhanced iterative one-bit phase alignment approach in which a receiver (e.g., target medical device) sends a feedback signal indicative of received beamforming power (or change in power) after each iteration of a sequence of transmission phase updates until a sufficient or maximum level of beamforming power is indicated.

However, rather than burdening a receiver with the energy cost of measuring received power and transmitting an indication of that measurement, the various embodiments contemplate a feedback signal indicative of received beamforming power use a backscatter assisted beamforming (BAB) mechanism in which a customized monotonic backscatter radio at the implant simply reflects received signals (i.e., signals from the distributed antenna array) and a nearby radio receiver that assesses the received backscatter signal power change/level. In this manner, a power-consuming operation of the medical implant (e.g., power assessment, signal generation and transmission) is offloaded to an auxiliary radio outside human body, thereby reducing energy consumption. To ensure detection/decoding of relatively weak backscatter signals, each carrier signal is pre-coded using, illustratively, chirp spreading spectrum (CSS) modulation (other types of modulation may be used such as code-division multiple access (CDMA), code-division multiplexing (CDM) and so on). The frequency-domain processing gain of CSS enables the system to detect the weak backscatter signal even 35 dB below the noise floor.

FIG. 1 depicts a wireless charging system according to an embodiment. Specifically, FIG. 1 depicts wireless charging system equipment disposed within an area such as a room having a floor 110, a ceiling 120 and various walls 115, wherein a plurality of slave radios 130 (e.g., radio frequency, microwave frequency or ultrasonic frequency transmitter) deployed at various locations around the room are configured to transmit respective signals/waves (e.g., sinusoidal radio signals at a common frequency/wavelength) toward at least one target device 200 within the room, illustratively a wireless charging module of a medical device implanted within a human. It is noted that the area within which the system 100 is deployed may also encompass a smaller or more precise area, such as a bed, chair, workspace and the like in which a human having a target device to be charged may spend an appreciable amount of time such that sufficient charging of an implanted medical device is provided in an unobtrusive manner without specialized visits to a charging center and the like.

Each target device 200 includes a backscatter radio configured to modulate data on top of a carrier signal (e.g., a sinusoidal radio signal) sent from a nearby slave radio 130 to reflect a modulated signal (i.e., the backscatter signal) toward a leader radio 140 proximate the target device 200.

The leader radio 140 (e.g., radio frequency, microwave frequency or ultrasonic frequency transceiver) is configured to receive/sense the backscatter signal, process the backscatter signal to derive therefrom information useful in assessing wireless charging of the target device 200, and use this information to update the operation of one or more of the slave radios 130 (e.g., via a wireless communications channel) in accordance with a methodology discussed below with respect to FIGS. 4A-4B.

A far-field wireless charging apparatus according to one embodiment comprises a leader radio configured for receiving spread spectrum (SS) modulated radio waves from a plurality of slave radios within an area including the leader radio and a target device, for receiving from the target device backscatter radio energy associated with the (SS) modulated radio waves, and for generating slave radio control signals; the leader radio, in a charging mode of operation, being configured for determining changes in received power associated with backscatter radio energy received from the target device and responsively transmitting control signals toward the slave radios configured to cause the slave radios to modify respective radio wave transmission times such that slave radio wave transmissions are substantially phase aligned when received at the target device.

In other embodiments, the leader radio 140 is configured to receive/sense the backscatter signal and provide characteristic information of the backscatter signal to the controller 150, wherein the controller 150 processes the characteristic information of the backscatter signal to derive therefrom information useful in assessing wireless charging of the target device 200, and uses this information to update the operation of one or more of the slave radios 130. Thus, the functions of the controller 150 may be implemented at a leader radio 140 proximate the target device 200 or at a stand-alone controller 150, such as depicted in FIG. 1. Thus, the leader radio 140 (or controller 150) is configured to provide control signal(s) suitable for use in controlling each of a plurality of slave radios 130 in a coordinated manner as discussed herein.

For purposes of this discussion it will be assumed that each of the slave radios 130 comprises an electromagnetic wave transmitting antenna such as radiofrequency (RF) transmitting antenna and associated transmitting, phase adaptation and control circuitry. In various embodiments, each of the slave radios 130 is capable of adjusting at least some of the various characteristics of a corresponding transmitted electromagnetic wave (e.g., phase, amplitude, frequency, modulation and so on) in response to a control signal such that a plurality of phase aligned electromagnetic waves may be provided at the location of the target device 200 within the room.

In various embodiments, the slave radios 130 and/or leader radio 140 comprise transceivers that are substantially similar in construction and capability such that any of the radios 130/140 may be configured as a leader radio 140, a slave radio 130, or both. In various embodiments, at least some of the slave radios 130 comprise multiple output transmitters having the capability to provide corresponding multiple transmitted electromagnetic waves where the various characteristics of each of the corresponding transmitted electromagnetic waves (e.g., phase, amplitude, frequency, modulation and so on) may be controlled independently by respective control signals such as provided by the controller 150 or respective receivers 140.

In various embodiments, the leader radio 140 is selected to be the leader radio 140 or receiver/transceiver 130/140 closest to or sufficiently proximate the target device 200 to be charged. The selected leader radio 140 may change as the target device 200 to be charged moves (e.g., the human with the implanted medical device moves within room or other rooms/areas configured to operate in accordance with the various embodiments as discussed herein), such that a different leader radio 140 (or transceiver 130/140) now closest to or sufficiently proximate the target device 200 to be charged is selected to perform the receiver/control functions described herein.

In various embodiments, a timing signal TS received from a timing reference source 105 is used by the controller 150 and/or one or more of the slave radios 130, receivers 140 or transceivers 130/140 to more accurately program and/or modify the transmitted electromagnetic signals/waves. For example, in various embodiments each of the slave radios 130 phase locks its respective transmitted wave to a clock synchronized with the timing source and, thereby, synchronized with the other slave radios 130. In this manner, the phase of the transmitted waves from the slave radios 130 may brought toward alignment at the target device 200 to be charged.

In various embodiments, multiple target devices/receivers 200 may be charged in a contemporaneous manner, wherein each target device 200 is associated with a respective leader radio 140 and at least a portion of the plurality of slave radio 130s.

In various embodiments, a timing signal TS received from a timing reference source 105 is used by the controller 150 and/or one or more of the slave radios 130 to more accurately program and/or modify their transmitted electromagnetic signals/waves. For example, in various embodiments each of the slave radios 130 phase locks its respective transmitted wave to a clock synchronized with the timing source and, thereby, synchronized with the other slave radios 130. In this manner, the phase of the transmitted waves from the slave radios 130 may brought toward alignment at the target device 200 to be charged.

Various embodiments contemplate that each of the various electromagnetic waves transmitted toward the target device will impart at least a minimum amount of power to the target device, where the minimum amount of power is less than an amount of power considered to be harmful to humans or otherwise undesirable, and where the phase alignment of the received electromagnetic waves provides an amount of power sufficient to support a medical device (or other device) activation or battery charging function, Internet of Things (IoT) activation/charging function or some other target device function.

In various embodiments, each of the slave radios 130 includes a wave or beam transmitting antenna and various transmitter circuitry. In various embodiments, each of a plurality of physically proximate beam transmitting antennas is associated with a single slave radio 130 (e.g., a single radio 130/140 powering multiple antennae along one wall, in a particular corner, on a ceiling or floor etc.). In various embodiments, substantially all of the plurality of beam transmitting antennas defining a three dimensional space are associated with a single transmitter.

In various embodiments, a grid or mesh of beam transmitting antennas is deployed where various subsets of the available transmitters (e.g., available radios 130/140) are used to define respective three-dimensional spaces. Specifically, a first subset or portion of a plurality of available transmitting antennas/radios 130 is initially selected to provide charging energy to a receiving device such as a medical device, cell phone, laptop, tablet, sensor, relay or other device to be charged, energize a sensor or other device, energize/trigger a communications device or enable/perform some another operation at the receiving device.

Based upon a backscatter signal reflected from target device 200 indicative of a change of power received at the target device 200, the leader radio 140 or controller 150 may cause one or more of selected slave radios 130 to recalibrate/reconfigure one or more operating characteristics to ensure that their corresponding transmitting antenna(s) provides waves that are substantially phase locked or power additive at the device such that sufficient energy is delivered thereto for charging or operation of the device.

More or fewer transmitting antennas or slave radios 130 may be used for charging/operating a receiving device to ensure that the power received at the receiving device reaches and maintains at least a minimum threshold power level, or a power level between minimum and maximum threshold power levels. Further, different transmitting antennas may be used such as for a receiving device that is moving proximate a grid of transmitting antennas. Further, the transmitting antennas selected to provide energy to a receiving device may change depending on various conditions. For example, as individual transmitting antennas or slave radios 130 become less able to supply energy to a receiver (e.g., distance to moving receiver, intervening obstacles, reflected signals and the like), those transmitting antennas are deselected from the set of transmitting antennas used to supply energy to the receiver.

While generally depicted as a room, the area within which the system is deployed may comprise a sleep space (bedroom or area around a bed) or work space (desk or area around a desk) for use by a human or animal having an implanted target device. The system includes a leader radio located proximate an expected location of the target device (or human having the target device implanted therein) and a plurality of slave radios disposed about the area and configured to provide sufficient energy to charge the target device.

Generally speaking, various embodiments contemplate use cases wherein the area within which the system is deployed is an area used for rest, work or other activity associated with an entity having a target device implanted therein may be expected to spend a sufficient amount of time such that the implanted target device may receive energy sufficient to effect a recharging or activation function. The implanted target device may comprise a medical device, surveillance/monitoring device, environmental monitoring/measuring device and the like. The entity may comprise a human, animal having, a mobile autonomous device (e.g., a robot or drone or other mobile system including an implanted target device), or a static autonomous device (e.g., an IoT device).

Figure 2:
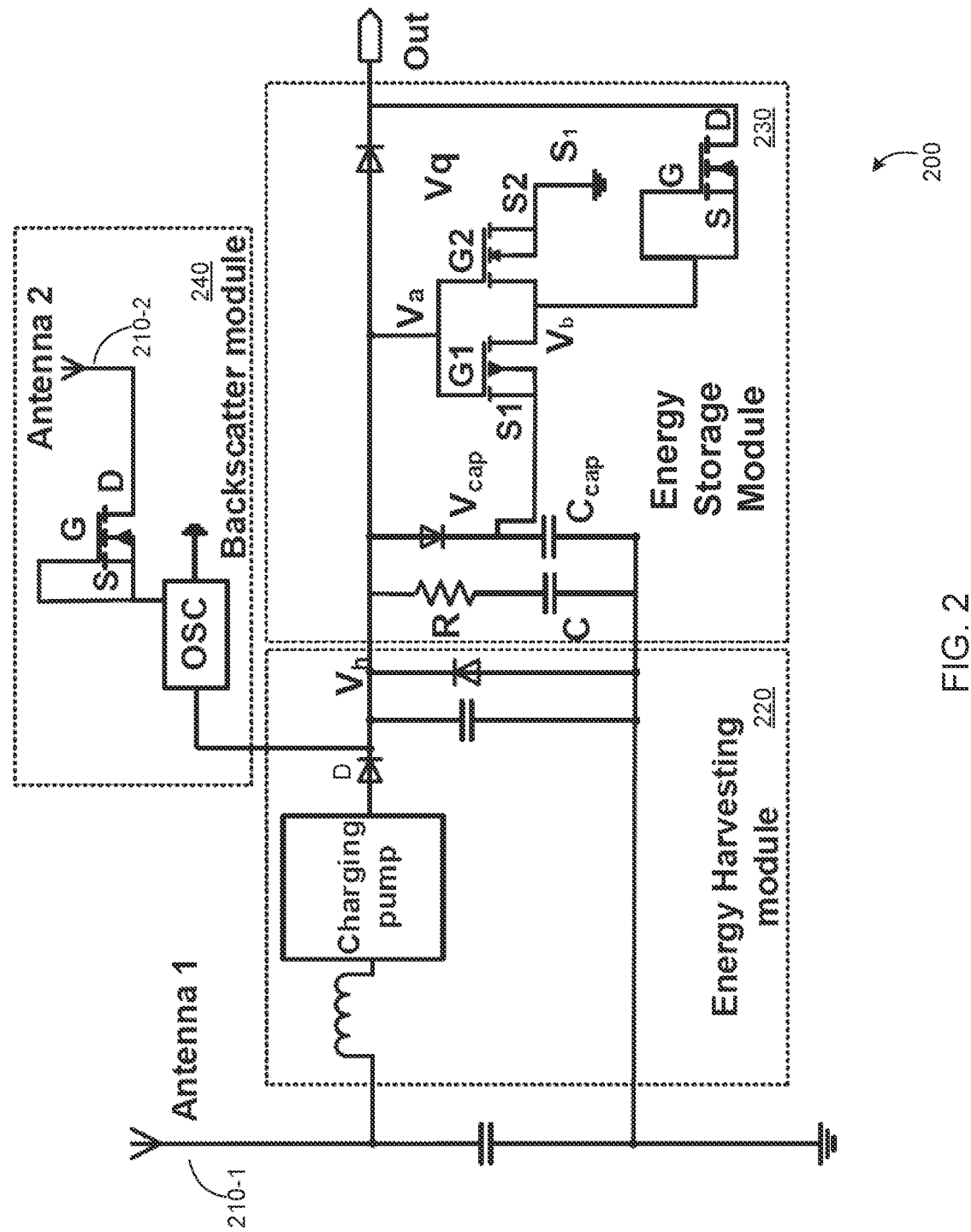
FIG. 2 depicts a block diagram of a wireless charging module in accordance with various embodiments.

FIG. 2 depicts a block diagram of a wireless charging module in accordance with various embodiments. Specifically, the wireless charging module 200 of FIG. 2 comprises a target device suitable for use within the wireless charging system as discussed herein. The wireless charging module 200 may be part of an implanted medical device (or other device) such that the medical device (or other device) is provided with a wireless charging function such as described herein in accordance with the various embodiments.

The wireless charging module comprises a first antenna 210-1 configured to receive output transmissions of the various slave radios 130 and couple the energy of such received signals to an energy harvesting module 220, which generates therefrom a charging signal having a voltage $V_h$. The charging signal is coupled to an energy storage module 230 and a backscatter module 240.

The energy storage module 230 uses the charging signal to charge one or more energy storage devices, illustratively a dual-capacitor energy storage module as depicted, other energy storage devices, batteries and the like. The energy storage module 230 provides an output power signal OUT for use by a medical device or other device (not shown).

The backscatter module used the charging signal to generate a backscatter signal for transmission via a second antenna 210-2, where the backscatter signal included information useful in determining a change in voltage level $V_h$ of the charging signal generated by the energy harvesting module.

Since the energy harvesting module 220 may exhibit an impedance varying with input RF power, the wireless charging module utilizes a two antenna design to allow parallel operation of the energy harvesting and backscatter generation functions without mutual interference such that a monotonic relationship between the backscatter signal power and the beamforming signal power is provided.

In operation, the energy harvesting module 220 absorbs RF power continuously from the first antenna 210-1. The harvested energy is used to power up the backscatter module and charge the medical device (or other device) via the energy storage module 230. The backscatter module 240 reflects RF signals impinged on the second antenna to the leader radio 140. A diode D may be interposed between the energy harvesting module 220 and backscatter module 240 to avoid electrical signal flow back into the energy harvesting module such that the two modules are physically isolated and a guaranteed monotonic relationship between the backscatter signal power and the beamforming signal power is provided.

Figure 3:
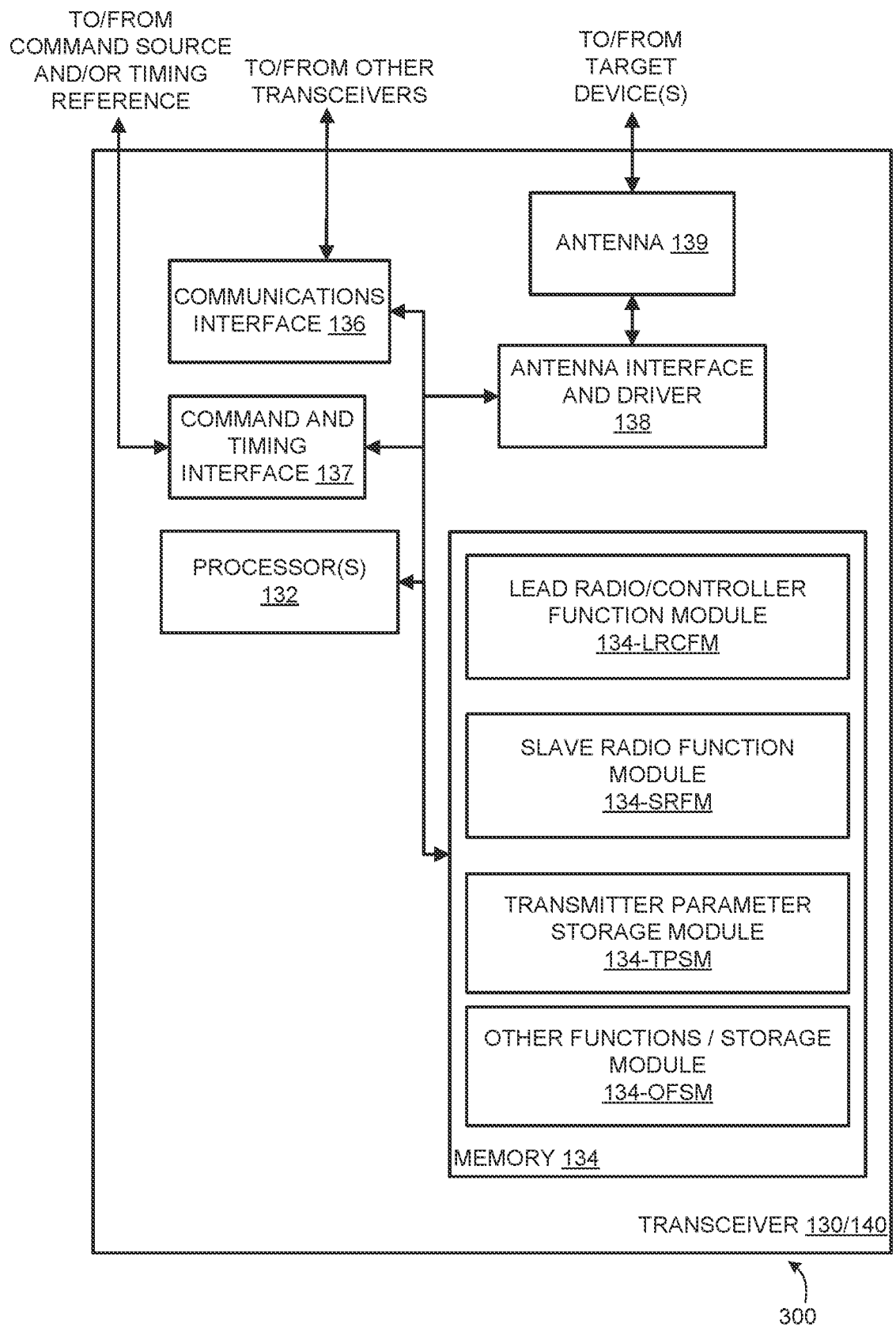
FIG. 3 depicts a block diagram of an exemplary radio transceiver suitable for use within the wireless charging system of FIG. 1.

FIG. 3 depicts a block diagram of an exemplary radio transceiver suitable for use within the wireless charging system of FIG. 1. It will be noted that the simplified transceiver 130/140 depicted in FIG. 3 may be reconfigured by removing transmitter functions to provide thereby a leader radio 140, or by removing receiver functions to provide thereby a slave radio 130.

The simplified implementation of a transceiver 130/140 of FIG. 3 is depicted as including one or more processor(s) 132, a memory 134, a communications interface 136, a command and timing interface 137, an antenna interface and driver 138 and an antenna 139. The processor(s) 132 is coupled to, and adapted to cooperate with, the memory 134, the communications interface 136, the command and timing interface 137, the antenna interface and driver 138 various other support circuitry (not shown) to provide the various functions as described herein with respect to the transceiver 130/140, slave radio 130 and/or leader radio 140.

The command and timing interface 137 is depicted as facilitating communications with an optional command source (not shown), such as a remote management or communications system. The communication channel supporting such communications may comprise any type of network or communications channel, such as Internet protocol (IP) network, a 3G/4G LTE wireless network, Wi-Fi network, Bluetooth or other wireless means. The command and timing interface 156 may also be used within the context of receiving a timing signal TS from a timing reference source 105, such as global positioning system (GPS) satellites, mobile network base stations and/or other timing sources.

The communications interface 136 is depicted as facilitating communications with other transceivers 130/140, slave radios 130 and/or receivers 140 such as depicted above with respect to FIG. 1. The communication channel supporting such communications may comprise a wireless communication network such as a 3G/4G LTE wireless network, Wi-Fi network, Bluetooth or other wireless means. In various embodiments both the communications interface 136 and the command and timing interface 137 may use the same (or same type of) communication channel.

The memory 134, generally speaking, stores programs, data, tools and the like that are adapted for use in providing various functions as described herein with respect to the figures. For example, the memory 134 is depicted as storing instructions associated with a leader radio/controller function module 134-LRCFM, a slave radio function module 134-SRFM, a transmitter parameter storage module 134-TPSM and another functions/storage module 134-OFSM, which instructions cause the respective modules to perform the various functions as described herein.

The leader radio/controller function module 134-LRCFM implements various leader radio functions (e.g., radio 140 as described herein), including (1) a chirp signal synchronization, function, (2) a backscatter radio cold start function, and (3) a beamforming orchestration function. It is noted that these functions may be implemented in hardware or a combination of hardware and software, such as via signal processing functions including chirp preamble generation and transmission, RSS fluctuation detection, two-bit feedback signal generation and transmission, backscatter signal detection, PCCS(0) calculation, smoothing, comparison and other functions as will be described below.

The slave radio function module 134-SRFM implements various slave radio (radios 130 as described herein), including (1) a chirp signal synchronization, function, (2) a backscatter radio cold start function, and (3) a beamforming orchestration function. It is noted that these functions may be implemented in hardware or a combination of hardware and software, such as via signal processing functions including chirp preamble detection, two-bit feedback signal detection and decoding, time calibration, beamforming signal detection, random number generation, phase adjustment, chirp carrier generation, and transmission as will be described below.

Beamforming Method

In operation, the various embodiments operate in accordance with a beamforming method by which sufficient energy to achieve a desired purpose (e.g., charging a battery) is delivered to target device 200 by causing the phase-alignment of a plurality of transmitted radiofrequency (RF) waves at the target device 200. The exemplary beamforming method advantageously avoids the need for the target device 200 to provide an accurate measurement at the of channel state information (CSI) of each wireless channel (usually achieved by having the receiver transmit a preamble to measure CSI of the backward channel and then leveraging channel reciprocity to infer CSI of the forward channel).

In particular, the various embodiments contemplate a general framework in which the controller 150 or leader radio 140 are configured to perform a 1-bit phase alignment method in which one or more phase-related operating characteristics of slave radios 130 are iteratively adjusted (controlled) in response to backscatter signal sensing and processing such that the transmitted signals of the slave radios 130 converge toward phase-alignment at the target device 200.

In each iteration or round, each transmitter updates its initial phase of transmission signals based on the feedback or control signal sent from the controller 150 or leader radio 140. This initial phase value is randomly selected within the range of $\pm\Phi$ with respect to the initial phase setting in the previous round.

In various embodiments, phase adjustment of a slave radio 130 is determined as follows:

$$\theta_i(n+1) = \begin{cases} \theta_i(n) + \delta_i(n), & \text{if } y[n] > y[n-1], -\Phi^\circ \leq \delta_i(n) \leq \Phi, \\ \theta_i(n-1) + \delta_i(n), & \text{otherwise} \end{cases},$$

where $\theta_i(n)$ is the initial phase of the $i^{th}$ transmitter in the $n^{th}$ round, and y[n] is the received signal power in the $n^{th}$ round.

The above framework is adapted for use within the context of the various embodiments described herein.

In one embodiment, the slave radios 130 are configured to operate on a 915 MHz ISM band. The leader radio 140 detects and decodes the feedback sent from the implant 200 (whose location is unknown a priori) and uses this information to govern the phase alignment of slave radios 130 in a next iteration. To minimize the energy consumption due to feedback signal creation and transmission, a low power backscatter radio is utilized at the target device 200 (e.g., power source of an implanted medical device) to offload computation from the implant to the leader radio 140 (or controller 150) outside of the human body.

It is noted that the 915 MHz frequency was selected in the above example due to its inclusion in the industrial, scientific and medical (ISM) radio bands. Various other ISM and non-ISM radio frequencies may also be used. Generally speaking, frequencies between approximately 100 MHz and 2 GHz are useful within the context of the various embodiments. Higher frequencies advantageously require smaller antennas, but such frequencies are also more susceptible to attenuation such as by the human body or other materials that might have devices inserted therein, or by air or other media through which transmission of radio signals is desired. For example, the ISM frequency of 433.92 MHz is also suitable for use in the various embodiments, though the antenna size (assuming the same design) would roughly double when compared to that supporting embodiments using 915 MHz.

In various embodiments, the slave radios may comprise software defined radios wherein multiple transmission frequencies and/or SS modulation techniques may be selected. However, to keep system costs low it is contemplated that leader radios, slave radios, transceivers (leader or slave) and the like may comprise fixed frequency devices or devices capable of broadcasting or receiving at a few selectable center frequencies (e.g., 434, 915 or 1830 MHz etc.), modulation techniques (CSS, CDMA etc.), and/or radio identification codes (radio identification codes modulated onto the carrier signal to identify which slave radios are actually contributing to charging of a target device).

The leader radio 140 may comprise a radio transceiver, radio receiver, software defined radio, mobile device (e.g., a smart-phone or a smart watch) and so on that is able to communicate with the slave radios 130 radios wirelessly (e.g., through Wi-Fi, Bluetooth or other wireless means).

Backscatter Assisted Beamforming (BAB)

Directly applying one-bit phase alignment algorithm to in-body wireless charging is unfeasible due to its excessive energy overhead. Generating a feedback signal with even the simplest modulation scheme (e.g., frequency shift keying (FSK)) costs at least tens of milliwatts, which can quickly add up after multiple iterations. Hence this operation alone would consume more power than what can be wirelessly delivered to the implant.

Backscatter radio neither generate carrier signals nor amplify transmission signals. It instead modulates data on top of the carrier signal (a sinusoidal tone) sent from a nearby active radio and reflects the modulated signal (termed as backscatter signal) directly back to the receiver. By avoiding carrier signal generation and power amplification, the backscatter radio achieves three to four orders of magnitude lower power consumption than the active radio. However, the lack of power amplifier renders the backscatter signal extremely weak, which is then made much worse by the excessive fading channel in deep tissues. There is power loss when a carrier signal traverses through the human body and is then reflected back by a backscatter radio. If a maximum achievable receiving power is around −89.74 dBm, which is below the noise floor, then neither CSI nor RSS can be measured (CSI measurement typically requires at least 6 dB higher signal strength than RSS measurement).

To minimize the power consumption of the backscatter radio, most of its operations are offloaded to the leader radio 140. Further, a chirp spread spectrum (CSS), a chirp pulse modulation that linearly sweeps a frequency band to generate a carrier signal, is used to further cut down the power consumption. Compared with conventional sinusoidal tone, CSS enables the wireless signal to be decodable below the noise floor (e.g., −137 dBm) by introducing the unique processing gain on the frequency domain. Given a fixed transmission power, the processing gain of chirp modulation is proportional to the product of the chirp symbol time St and bandwidth Sbw: St×Sbw. Accordingly, different trade-offs between system delay and spectrum utilization in different scenarios may be made without reducing signal detection accuracy. In various embodiments, the chirp bandwidth and symbol time are set to 40 KHz and 4 ms. Other settings may also be used.

Backscatter Design

Chirp modulation enables the leader radio 140 to detect the weak backscatter signal, and the backscatter signal power changes monotonically with the received beamforming power. Hence, by observing the power change of the received backscatter signals, the leader radio 140 may infer the power change at the backscatter radio.

Specifically, the backscatter module 140 shifts the superimposed carrier signal to another frequency band (for interference avoidance) and reflects it back to the leader radio 140. This is achieved by letting the backscatter radio generate a baseband signal at frequency $f_s$ and mix this baseband with the superimposed carrier signal at frequency $f_1$. The mixer operation will shift this superimposed carrier signal to two other frequency bands; namely, $f_1+f_s$ and $f_1-f_s$.

The leader radio 140 detects the backscatter signal on one of these two frequency bands and infers therefrom the beamforming power change. Following the iterative beamforming methodology, the leader radio 140 then guides slave radios 130 to adjust their signal phase settings. To avoid interference between the carrier signal and the backscatter signal, various embodiments conservatively set fs to 100 KHz, which is 1.5× larger than the default chirp bandwidth (40 KHz).

Beamforming Power Change Inference

The leader radio 140 observes the power change of the backscatter signal and infers the power change of the superimposed carrier signal accordingly. The backscatter signal is extremely weak. For example, after going through considerable channel fading, the backscatter signal is usually below a minimum detectable signal (MDS) of the commercial RF radios (e.g., around −75 dBm for an Universal Software Radio Peripheral (USRP) N210 software defined radio).

To extract the power change information from a weak backscatter signal in noisy measurements, a new metric is defined and used in the various embodiments; namely, CCS(0)—the peak value of the frequency-domain cross-correlation between the received backscatter signal and the source chirp. The inventors have determined that the strength of CCS(0), namely, PCCS(0), changes monotonically with the backscatter signal power, and that PCCS(0) has sufficient resolution to reflect the power change of backscatter signals. It is noted that there is an increasing trend of PCCS(0) values as the power of carrier signals grows. However, due to signal noises and measurement errors, PCCS(0) fluctuates significantly, which may confuse the leader radio 140 and cause extra beamforming iterations.

As such, in various embodiments, the leader radio 140 thus smooths PCCS(0) measurements using an adaptive Kalman filter.

Time Synchronization

Tight time synchronization of, illustratively, CSS chirp signals is important to the success of beamforming since otherwise the beamforming power will fluctuate drastically due to the periodical coherent and incoherent signal combinations. To achieve this a two-step chirp synchronization methodology is used, where each step contemplates various communications between a leader radio 140 and each of a plurality of slave radios 130.

Figure 4A:
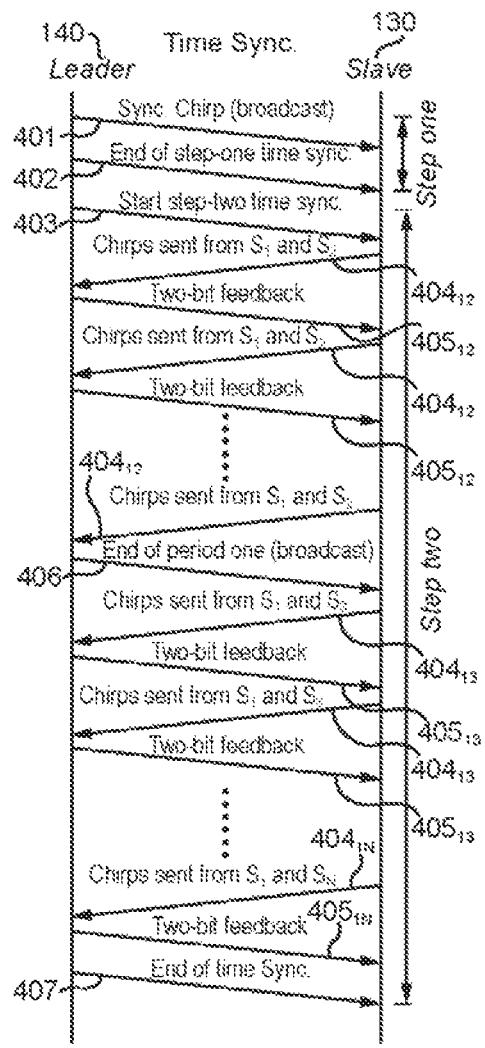
FIG. 4A depicts a flow diagram of a leader/slave time synchronization method suitable for use in various embodiments.

FIG. 4A depicts a flow diagram of a leader/slave time synchronization method suitable for use in the various embodiments. The method 400A of FIG. 4A is directed to synchronizing a leader radio 140 and a plurality of slave radios 130.

In a first leader/slave time synchronization mode of operation, the leader radio 140 broadcasts (401) a chirp preamble. Each slave radio 130 synchronizes with this broadcast chirp preamble through cross-correlation. The resulting lag then translates into a sample time offset between the reference chirp from the leader radio 140 and the received chirp preamble at each slave radio 130. Each slave radio 130 can thus compensate for this initial (sample) time offset. It is noted that due to heterogeneous software and hardware processing delays among radios (i.e., different types of radios, differences in components of radios etc.), a residual time offset may still remain. The leader radio 140 may broadcast (402) an "end of first step" signal. Alternatively, the first step sync time may be predefined. Thus, at the first step, a temporal offset is determined for each of the slave radios 130.

In a second leader/slave time synchronization mode of operation, optionally initiated by a transmission (403) from the leader radio 140, the slave radios 130 transmit (404) a continuous chirp signal while the leader radio 140 listens. All slave radios 130 then take turns (405) to compensate for any residual time offset sunder the guidance (via two-bit feedback 405) of the leader radio 140. It is noted that the amplitude of the superimposed signal (at the leader radio 140) will fluctuate periodically if the incoming chirps are not tightly time synchronized. The larger the time offset, the faster the received signal amplitude fluctuates. The leader radio 140 computes the fluctuation rate of the received signal amplitude using, e.g., fast Fourier transform (FFT) and uses this information to guide slave radios 130 for initial time offset compensations.

In operation the second step goes through a total of N−1 periods. In each period i, the system aligns the initial time of the i+1$^{th}$ slave radio 130 to the first slave radio 130. Specifically, in a first period, two slave radios 130 (S1 and S2) transmit ($404_{12}$) respective continuous chirp signals simultaneously. These two signals add up at the leader radio 140. Since S1 and S2 are not strictly time synchronized, a signal amplitude fluctuation will be detected at the leader radio 140. The leader radio 140 then transmits ($405_{12}$) a two-bit feedback to S2, thereby notifying S2 to add or subtract one sample time, or to stop. S2 calibrates its clock based on this two-bit feedback signal, and then generates a updated continuous chirp signal. The leader radio 140 detects the change of the updated signal amplitude's fluctuation rate and transmits an updated two-bit feedback to S2. The method 400A iterates steps $404_{12}$ and $405_{12}$ until slave radios S1 and S2 are synchronized.

The method 400A then enters (406) a next period fora next slave radio 130 (e.g. S3) and iterates steps (now steps $404_{13}$ and $405_{13}$) until slave radios S1 and S3 are synchronized.

The method 400A enters (406) a number of next periods for each of the slave radios 130 to be used until all slave radios 130 are tightly time synchronized at the end of the last period.

It is noted that the leader/slave time synchronization methodology 400A does not cause an excessively long delay. The first step of the algorithm can already yield small residual time offsets and usually a reasonable number of iterations (tens) are needed in each period. The fluctuation rate decreases as the algorithm iterates, indicating smaller time offsets between the leader radio 140 and slave radios 130. The overall iteration time is around 0.27 seconds using the exemplary parameters discussed above. It is noted that while the first step is optional, the use of the first step enables more rapid convergence to the ultimate goal of phase aligned radio wave reception at the leader 140 (or target 200).

Cold Start Methodology

The above discussion is generally directed to beamforming towards a backscatter radio that is already "awake" (e.g., a target device 200 sufficiently powered up to interact with the radios 130/140). However, where the backscatter radio is not awake, a bootstrap or cold start process may be used to awaken the backscatter radio. Specifically, without enough power (e.g., −20 dBm) a typical backscatter radio cannot wake up to provide feedback (by simply reflecting a signal). On the other hand, without the feedback, an appropriate beam cannot be formed to charge the target device including the relevant backscatter radio.

In one embodiment, the potential beamforming space is simply searched in the hope of accidentally waking up a backscatter radio. This is not the best approach.

Figure 4B:
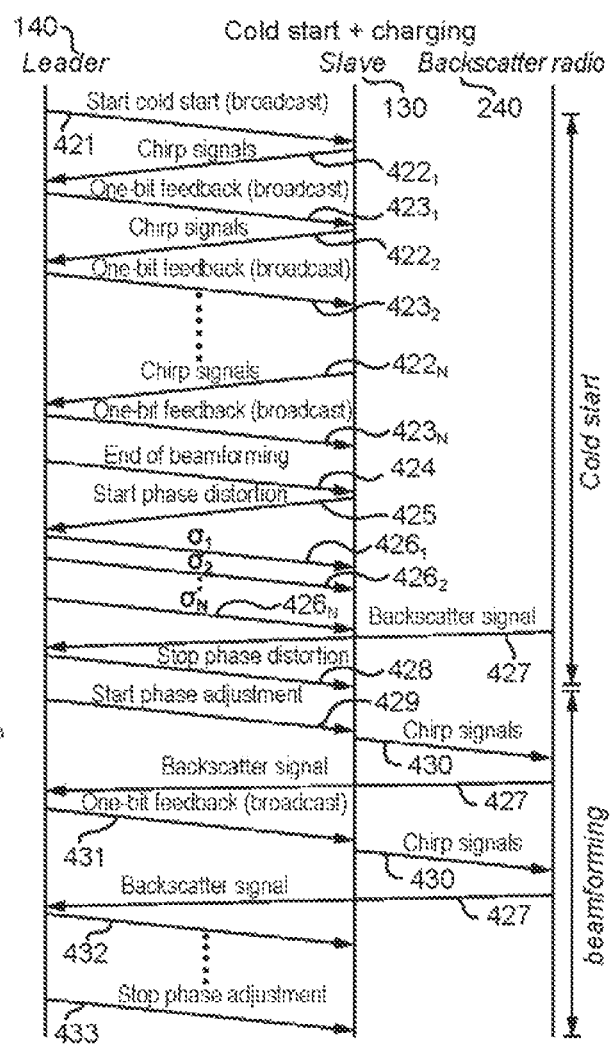
FIG. 4B depicts a flow diagram of a cold start method suitable for use in various embodiments.

FIG. 4B depicts a flow diagram of a cold start method suitable for use in the various embodiments. The method 400B of FIG. 4B is directed to activating or waking up a backscatter radio proximate a leader radio 140.

Generally speaking, after initiating a cold start process (421), if the leader radio 140 receives (422) signals from the slave radios 130 but not from the backscatter radio, then the leader radio 140 assesses the slave radio 130 signal power changes and transmits (423) a feedback signal accordingly. Iteratively (422/423), the slave radio 130 signals will be aligned at the leader radio 140 and the leader radio will signal (424) an end of an initial slave radio 130 beamforming process (beams delivering energy to the location of the leader radio 140), and the slave radios 130 will signal (425) readiness to begin a phase distortion process (move delivered energy about the location of the leader radio 140).

Since the backscatter radio is close to the leader radio 140, the method 400B need only search a limited space around the leader radio 140. It is observed from free-space simulations that when signals are not perfectly aligned at the receiver, the main beamforming lobe grows and many side lobes appear. Therefore, intentionally dithering the phases (e.g., imparting a random phase error $-\sigma < \delta\varphi < \sigma$ onto the beamforming phase settings $\varphi opt$) at each slave radio 130 (in response to phase offset/feedback signals 426) moves these side lobes around such as to spread the energy proximate the leader radio 140.

When the backscatter radio 240 gains enough energy as a result of this spreading effort, it "wakes up" and starts to reflect (427) slave radio 130 signals. The leader radio 140 will then receive (427) the backscatter signal and go back to its normal or target device charging function by transmitting (428) a signal to the slave radios 130 configured to cause them to stop phase distortion functions, thereby ending the cold start process and resuming a normal or target charging process.

Specifically, as the beamforming power spreads with the enlarging main lobe and side lobes, the goal is that these lobes (having power that is less than the original maximal beamforming power) are strong enough to wake up the backscatter radio 240. It is noted that in comparison with the optimal beamforming energy, the power of the enlarged main lobe and side lobes drops only by 3.6 dB. To achieve a desirable charging efficiency, the optimal beamforming power of a multi-antenna system is preferably much larger than the power required in the cold start period (e.g., −15 dBm). The cold start period ends (431) when the leader radio 140 successfully receives the frequency shifted backscatter signal or the intended backscatter signal is not received within a preset time window. In the latter case, the cold start process fails.

Thus, the leader radio 140 in a cold start mode of operation is configured for searching for a target device by sequentially interacting with the slave radios 130 to modify respective radio wave transmission times such that slave radio wave transmissions are received at each of a corresponding sequence of locations proximate the leader radio in a substantially synchronized manner to thereby achieve and hold beamforming at each of the sequence of locations proximate the leader radio, wherein the cold start mode of operation is exited in response to the leader radio receiving a backscatter signal indicative of a proximate target device. The sequence of locations may be defined in space and held for a predetermined amount of time. The purpose of moving the location in space within which phase alignment of the slave radio transmissions occurs is to provide enough energy to excite backscatter from a target device and in doing so find a target device. The cold start mode of operation may be invoked at any time, such as system power up, the loss of contact with a currently charging target device, the desire to select multiple target charging devices and so on.

Determining the Phase Error Bound σ

The scanned area is defined as, illustratively, the area where the received energy is higher than 30% of the optimal beamforming power (equivalent to <5 dB loss). Other definitions higher or lower may be used in different embodiments. Simulations investigated the impact of the phase error bound σ on the scanning ratio (i.e., the ratio of the scanned area with respect to the entire searching area, illustratively a 2×2×2 m3 cube centered at the leader radio 140. These simulations show that the scanning ratio as a function of phase adjustment with different σ values. The scanning ratio grows drastically as an increase of σ from 10° to 30° and further to 60°. It then slows down as σ increases further. To better understand this result, simulations further perturbed the phase 100 times in different σ settings to derive thereby scanning ration, which achieve a maximum value when 45°≤σ≤65°. Suggested by this trend, various embodiments set σ to 55°, though other settings of σ may be used.

Balancing Convergence and Delay

In the iterative beamforming methods discussed herein, the phase bound Φ is critical to system performance. If Φ is too large, the methods may rapidly converge to a non-optimal beamforming result. By contrast, a too small Φ will lead to better beamforming results, but with a longer delay. Thus, the choice of Φ is preferably made to balance these two factors.

Various embodiments us an adaptive method to dynamically update Φ during beamforming. At the beginning of the beamforming process, a large bound value is selected to speed up the process. As the beamforming process continues, a smaller bound value is selected such that the optimal point is not missed. A computation of a suitable phase error bound Φ is made at each iteration based on a high order polynomial function Φ=P(n), where n is the iteration index. This polynomial function takes into consideration the relationship between the backscatter reflected signal power and the beamforming power.

The normal or target device charging function or mode of operation, as described herein after exiting the cold start process, is generally directed to a beamforming method wherein the radio transmissions of multiple slave devices 130 are received by a target device 200, which uses harvests the received radio energy to power an energy storage module and a backscatter module (e.g., such as depicted above with respect to FIG. 2).

The time synchronization method or mode of operation 400A used to synchronize received radio energy at the leader radio 140 in a manner tending to maximize the total received power (e.g., phase alignment of the received signals in a manner tending to add rather than subtract radio wave amplitude) may also be used to maximize total received power at the target device. It is noted that while step one is optional, the use of step one enables more rapid convergence to the ultimate goal of phase aligned radio wave reception at the leader radio 140 or target device 200.

Referring to FIG. 4B, after termination of the cold start routing (428), a beamforming mode of operation is entered when the leader radio 140 transmits (429) a signal configured to cause the slave radios 130 to enter a phase adjustment mode of operation as part of the beamforming method used to charge a target device 200. Specifically, as with the optional first step (401-402) of the method 400A of FIG. 4A, the leader radio 140 may generate an initial chirp for use by the slave radios 130 in assessing initial time offsets, whereupon iterations for the slave devices 130 comprise transmission of slave radio signals (430) resulting in power-change indicative backscatter signals (427) which are in turn used by the leader radio 140 to generate feedback signals 432 for use by the slave radios 130 in offsetting their transmission times such that the various slave radio transmissions 430 received by the target device converge toward phase alignment at the target device, thereby imparting charging energy to the target device.

The normal beamforming method by which a target device is charges may be implemented using some or all of a plurality of available radios in an area (e.g., a room, bed, workspace and the like).

In various embodiments, all of the available slave radios in an area are used based on the assumption that more power to the target device is better, and that excess power received by the target device may be easily dissipated.

In various embodiments a calculation is made as to the number of slave devices transmitting to a single target device, such that excess power is not imparted to the target device so as to avoid excess energy dissipation from a target device implanted within a human body, excess energy being wasted, unnecessary use of one or more slave radios that might be repurposed for other target devices and so on.

In some embodiments, each slave radio is associated with a respective radio identification code which may be included with or modulated upon the transmitted radio wave such that the leader device can examine a backscatter signal to identify the slave radio(s) that have contributed energy to the generation of that signal by a target device. In this manner, those slave radios offering little or no contribution to a target device may be repurposed to service another target device under the control of respective leader radio for that other target device.

Figure 5:
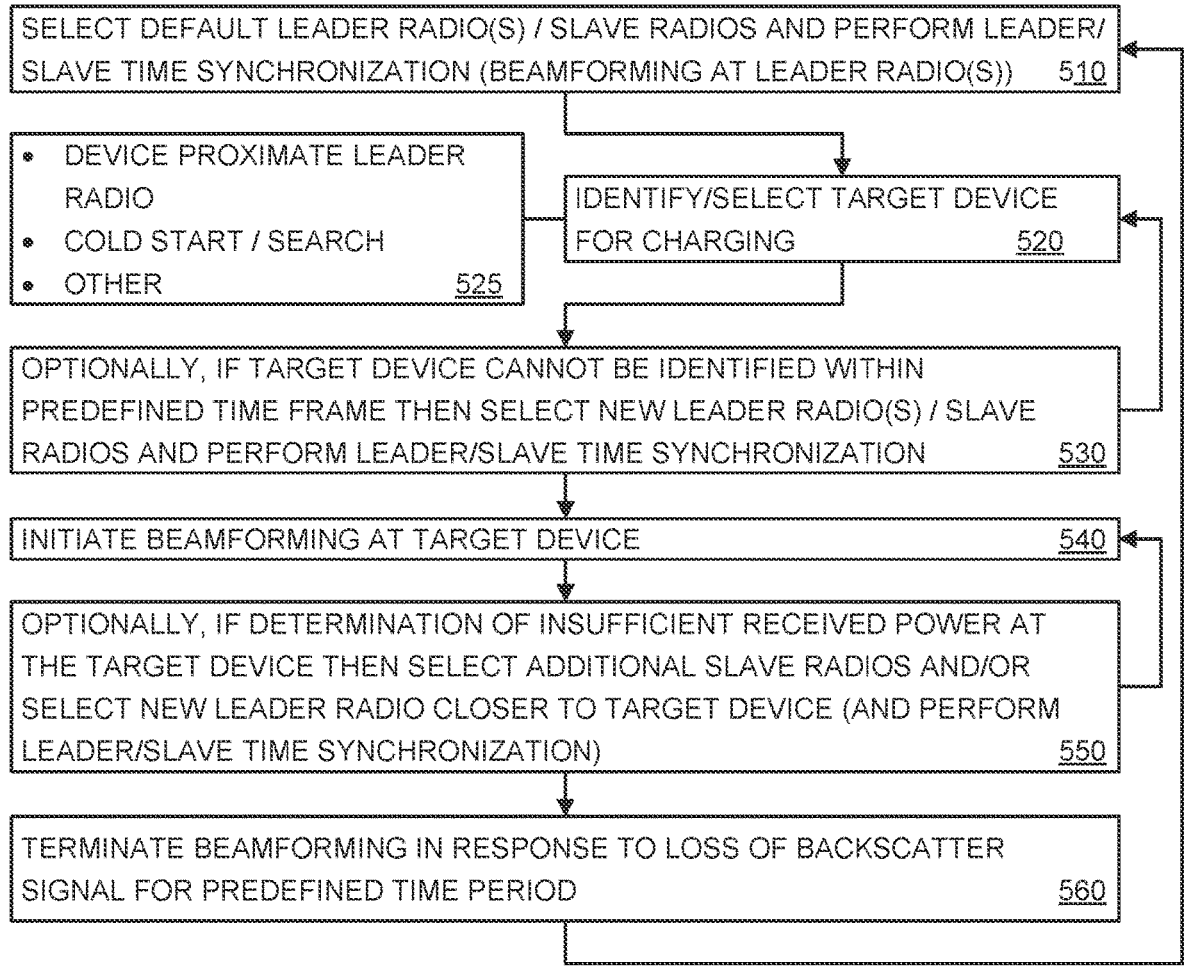
FIG. 5 depicts a flow diagram of a method according to various embodiments.

FIG. 5 depicts a flow diagram of a method according to various embodiments. In particular, the method 500 of FIG. 5 is directed to a generalized method using the various techniques/processes described above to achieve the goals of identifying target devices, selecting leader/slave radios for use in charging the identified target devices, and managing the process of charging the identified target devices.

As step 510, for an area in which the system is deployed, a default leader radio or radios and, for each leader radio, multiple slave radios are selected, the default selected leader/slave radios configured to operate in the above-described manner to provide thereby substantial phase alignment of the slave radio transmissions at the leader radio.

At step 520, a target device is identified or selected for charging. Referring to box 525, the identified/selected target device may comprise a device proximate the leader radio, a device identified using a cold start/search technique, or device identified in some other manner.

At optional step 530, if the target device cannot be identified within a predefined timeframe (e.g., five seconds, 30 seconds, one minute or some other amount of time) then a new leader radio and multiple slave radios are selected, the newly selected leader/slave radios configured to operate in the above-described manner to provide thereby substantial phase alignment of the slave radio transmissions at the leader radio.

At step 540, beamforming at the target device is initiated. That is, after the target device has been selected such that the leader radio is able to sense backscatter signals generated by the target device, the leader radio and slave radios are configured to operate in the above-described manner to result in substantial phase alignment of the slave radio transmissions at the target device. It is noted that the leader radio may continually and iteratively adapt slave radio operation to compensate for target device movement within the area.

At optional step 550, if the leader radio determined that the target device is receiving insufficient power, then additional slave radios and/or a new leader radio closer to the target device may be selected, wherein the additional slave radios and/or newly selected leader radio and slave radios are configured to operate in the above-described manner to provide thereby substantial phase alignment of the slave radio transmissions at the leader radio. The method 500 then proceeds to step 540 to initiate beamforming at the target device with the additional slave radios and/or new leader radio.

At step 560, beamforming at the target device may be terminated in response to a loss of backscatter signal or a predefined time period (e.g., five seconds, 30 seconds, one minute, one hour or some other amount of time), such as when a human having a medical implants leaves the room, bed or workspace area within which the wireless charging system has been deployed. The method 500 then proceeds to step 510 where the default leader and slave radios are selected again in.

In various embodiments, slave radios are configured to operate at multiple frequencies where each frequency may be associated with control/charging operations guided by a respective leader radio.

In various embodiments, each of the multiple frequencies associated with the slave radio may be generated via respective transmission/modulation circuitry. In various embodiments, each of the multiple frequencies associated with the slave radio may be generated via the same transmission/modulation circuitry, wherein time division multiple access (TDMA) techniques are used to provide respective slots for each of the respective frequencies used by the slave radios. In these embodiments, the techniques described here in four time synchronization, cold start and normal charging/beamforming functions are adapted to be used in a time/slot synchronize manner such that the charging energy imparted to a target device is imparted only during a portion of the slot duration associated with the charging of that target device.

Embodiments for Wireless Power Transfer to In-Body Devices

Various embodiments described above may be further modified to provide a far far-field wireless power transferring (WPT) system that charges in-body devices such as medical implants, using multiple Wi-Fi transmitters to transmit power to an energy storage device associated with the implant. The implemented technology removes the need for surgery to replace batteries in medical devices such as pacemakers; and does not require a person to sit still or wear cumbersome devices attached to their bodies for the purposes of charging/re-charging. Other types of implanted medical devices may comprise cardiac defibrillators, neurostimulators, controlled drug release devices, various monitoring devices and so on.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A far-field wireless charging system, comprising:
a plurality of slave radios located about an area, each slave radio configured for transmitting a respective spread spectrum (SS) modulated radio wave within the area, and for adapting a time-offset of the radio wave in response to a control signal; and
a leader radio, configured for receiving backscatter radio energy from a target device within the area, for receiving SS modulated radio waves from slave radios, and for generating slave radio control signals;
the leader radio, in a time synchronization mode of operation, configured for determining changes in received power associated with radio wave transmissions of at least a portion of the plurality of slave radios and responsively interacting with the slave radios to modify respective radio wave transmission times such that slave radio wave transmissions are received at the leader radio in a substantially synchronized manner to thereby achieve beamforming at the leader radio;
the leader radio, in a charging mode of operation, is configured for determining changes in received power associated with backscatter radio energy received from a target device and responsively interacting with the slave radios to modify respective radio wave transmission times such that slave radio wave transmissions are received at the target device in a substantially synchronized manner to thereby achieve beamforming at the target device.

2. The system of claim 1, wherein the leader radio in the time synchronization mode of operation is configured for:

broadcasting a synchronizing chirp preamble configured to enable each slave radio to determine an initial transmission time offset; and for each slave radio, iteratively transmitting thereto control signals indicative of changes in total received power at the leader radio associated with respective changes to slave radio transmission time until slave radio waves received at the leader radio are substantially phase aligned.

3. The system of claim 2, wherein control signals indicative of changes in total received power at the leader radio comprise two-bit feedback signals.

4. The system of claim 1, wherein the leader radio in the charging mode of operation is configured for:

for each slave radio, iteratively transmitting thereto control signals indicative of changes in total received power at the target device associated with respective changes to slave radio transmission time until slave radio waves received at the target device are substantially phase aligned.

5. The system of claim 1, wherein the system includes a plurality of radio transceivers capable of operating as either a leader radio or a slave radio, and the leader radio is selected as the transceiver closest to the target device.

6. The system of claim 1, wherein the area comprises a sleep space or work space for use by an entity having a target device implanted therein.

7. The system of claim 6, wherein the entity having a target device implanted therein comprises one of a human, an animal, and a mobile autonomous device.

8. The system of claim 1, wherein the system includes a leader radio located proximate an expected location of the implanted target device and a plurality of slave radios disposed about the area and configured to provide sufficient energy to charge the implanted target device.

9. The system of claim 1, wherein:

the leader radio, in a cold start mode of operation, is configured for searching for a target device by sequentially interacting with the slave radios to modify respective radio wave transmission times such that slave radio wave transmissions are received at each of a corresponding sequence of locations proximate the leader radio in a substantially synchronized manner to thereby achieve and hold beamforming at each of the sequence of locations proximate the leader radio, wherein the cold start mode of operation is exited in response to the leader radio receiving a backscatter signal indicative of a proximate target device.

10. The system of claim 9, wherein the leader radio, in the cold start mode of operation, is further configured to cause the selection of a new leader radio and slave radios in response to a determination that a backscatter signal indicative of a proximate target device is not received within a predefined time period.

11. The system of claim 1, wherein the SS modulated waves comprise chirp spread spectrum (CSS) modulated waves.

12. The system of claim 1, wherein the SS modulated waves comprise one or more of chirp spread spectrum (CSS) modulated waves, code-division multiple access (CDMA) modulated waves, and code-division multiplexing (CDM) modulated waves.

13. The system of claim 1, wherein the portion of the plurality of slave radios is determined with respect to a number of slave radios determined to be able to provide at least sufficient power to a target device.

14. The system of claim 13, wherein each slave radio modulates a respective identification code upon its transmitted radio signal, the leader radio being further configured to identify those slave radios insufficiently contributing to the delivery of power to the target device.

15. The system of claim 1, wherein the leader radio is further configured to change the portion of slave radios used to charge a target device.

16. The system of claim 1, further comprising:

a second leader radio, configured for receiving backscatter radio energy from a target device within the area, for receiving SS modulated radio waves from slave radios, and for generating slave radio control signals;

the second leader radio, in a time synchronization mode of operation, configured for determining changes in received power associated with radio wave transmissions of at least a second portion of the plurality of slave radios and responsively interacting with the second slave radios to modify respective radio wave transmission times such that second slave radio wave transmissions are received at the second leader radio in a substantially synchronized manner to thereby achieve beamforming at the second leader radio;

the second leader radio, in a charging mode of operation, determining changes in received power associated with backscatter radio energy received from a second target device and responsively interacting with the second slave radios to modify respective radio wave transmission times such that second slave radio wave transmissions are received at the second target device in a substantially synchronized manner to thereby achieve beamforming at the second target device.

17. The system of claim 1, wherein the target device comprises:

a first antenna, for receiving said SS modulated waves;

an energy harvesting module, coupled to the first antenna and converting energy derived from the received SS modulated waves to a charging signal suitable for use by an energy storage device; and a backscatter module, for reflecting a backscatter signal derived from the received SS modulated waves via a second antenna.

18. A far-field wireless charging method for use at a leader radio proximate a target device to be charged by spread spectrum (SS) modulated radio waves transmitted from each of a plurality of slave radios, the method comprising:

determining, in a charging mode of operation, changes in total received power at the target device associated with radio wave transmissions of each of the plurality of slave radios using backscatter radio energy reflected from the target device; and transmitting control signals configured to cause the slave radios to modify respective radio wave transmission times such that slave radio wave transmissions are received at the target device in a substantially synchronized manner to thereby achieve beamforming at the target device.

19. The system of claim 1, wherein the target device comprises any of a device implanted in a human and an Internet of Things (IOT) device.

20. The method of claim 18 wherein said charging mode of operation comprises, for each slave radio, iteratively transmitting thereto control signals indicative of changes in total received power at the target device associated with respective changes to slave radio transmission time until slave radio waves received at the target device are substantially phase aligned.

21. Apparatus configured to implement far-field wireless charging of a proximate target device, the apparatus comprising:

a leader radio, configured for receiving spread spectrum (SS) modulated radio waves from a plurality of slave radios within an area including the leader radio and the target device, for receiving from the target device backscatter radio energy associated with the (SS) modulated radio waves, and for generating slave radio control signals;

the leader radio, in a charging mode of operation, being configured for determining changes in received power associated with backscatter radio energy received from the target device and responsively transmitting control signals toward the slave radios configured to cause the slave radios to modify respective radio wave transmission times such that slave radio wave transmissions are substantially phase aligned when received at the target device.

22. The method of claim 18, further comprising:

prior to entering the charging mode of operation, the leader radio operates in a time synchronizing mode of operation wherein:

changes in total received power at the leader radio are associated with radio wave transmissions of each of the plurality of slave radios; and transmitting control signals configured to cause the slave radios to modify respective radio wave transmission times such that slave radio wave transmissions are received at the leader radio in a substantially synchronized manner to thereby achieve beamforming at the leader radio.

23. The method of claim 22, wherein the leader radio in the time synchronization mode of operation is configured for:

broadcasting a synchronizing chirp preamble configured to enable each slave radio to determine an initial transmission time offset; and for each slave radio, iteratively transmitting thereto control signals indicative of changes in total received power at the leader radio associated with respective changes to slave radio transmission time until slave radio waves received at the leader radio are substantially phase aligned.

24. The method of claim 18, wherein the SS modulated waves comprise one or more of chirp spread spectrum (CSS) modulated waves, code- division multiple access (CDMA) modulated waves, and code-division multiplexing (CDM) modulated waves.

* * * * *